May 5, 1942.   J. R. STEEGSTRA   2,282,261
HIGH FREQUENCY TESTING APPARATUS
Filed April 10, 1940
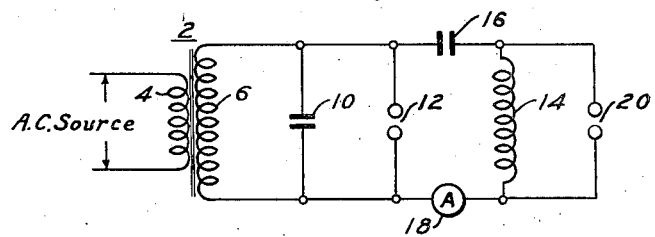
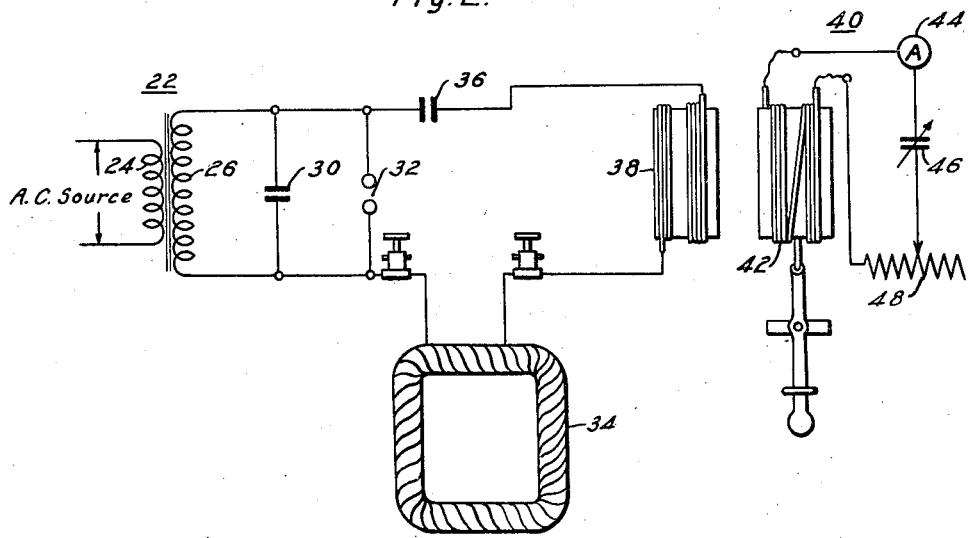
WITNESSES:
INVENTOR
John R. Steegstra.
BY
ATTORNEY Patented May 5, 1942

2,282,261

UNITED STATES PATENT OFFICE 2,282,261

HIGH FREQUENCY TESTING APPARATUS

John R. Steegstra, Bridgeport, Conn., assignor to Westinghouse Electric & Manufacturing Company, East Pittsburgh, Pa., a corporation of Pennsylvania Application April 10, 1940, Serial No. 328,861

4 Claims. (Cl. 175—183)

The present invention relates to electrical testing, and it has particular relationship to apparatus for the high frequency testing of insulated conductors and coils.

In order to satisfactorily test the insulation of electrical coils for incipient faults and weak spots, it has been found necessary to apply a potential considerably in excess of the normal operating voltage. A high frequency test circuit for this purpose is disclosed in United States Patent No. 1,792,320 to Peters et al. In this patent the circuit including the winding is preferably a tuned circuit in order that both the magnitude and frequency of the testing current will vary in the case of a faulty winding by reason of leakage of current between the turns of the coil. The variations from normal may be detected by means of a resonant circuit containing an ammeter or other current-responsive device, the circuit being so related to the winding under test as to receive energy by magnetic induction or radiation, or both.

More specifically, the Peters et al. patent discloses a circuit in which a high potential transformer charges a condenser which, upon reaching a predetermined potential, discharges through a spark gap to provide an oscillating current. This oscillating current is passed through a coil undergoing test and its reaction is observed to determine the condition of the insulation. Despite extensive experiments, it has been found difficult to control this circuit so as to obtain a spark which was always satisfactory. For a cheap portable set, the cost of an accurate rotating gap is, of course, prohibitive. According to the present invention, however, a condenser is placed in series with the spark gap. This modification causes the circuit to provide a steady and intense spark which greatly improves its operation.

It is accordingly an object of the invention to provide a novel and improved means for testing electrical insulation.

It is another object of the invention to provide an improved circuit for testing insulation of electrical coils by means of a high frequency test potential.

A further object of the invention is to provide an improvement on the test circuit of the aforesaid Peters et al. patent.

Other objects and advantages of the invention will become evident from the following detailed description taken in conjunction with the accompanying drawing, in which:

Figure 1 is a diagrammatic view of testing apparatus embodying the invention; and Fig. 2 is a similar view of another embodiment of the invention.

Referring to Fig. 1, a high potential, high reactance transformer 2 includes a primary winding 4 and a secondary winding 6. The primary 4 is energized from an alternating current source, while the secondary 6 has a condenser 10 connected across it. The transformer may be designed to have a secondary potential in the order of 2000 to 220,000 volts or more when the primary 4 is energized by a low potential, such as the usual 115 volts power circuit. Paralleling the condenser 10 is a stationary spark gap 12 which is designed to provide a path for the condenser discharge when its potential reaches a predetermined magnitude. A coil 14, the insulation of which is to be tested, is connected across the spark gap 12 in series circuit with a second condenser 16 and a radio frequency ammeter 18. A calibrated or voltage measuring spark gap 20 is connected in parallel with the coil 14. The ammeter and the voltage spark gap are provided to indicate the condition of the coil 14 in a manner described hereinafter.

In Fig. 2, a primary winding 24 of a transformer 22 is similarly energized from an alternating current source while its secondary 26 has a condenser 30 connected across it. Spark gap 32 is connected in parallel with the condenser 30 to permit energization of a coil 34 through condenser 36. Also in series with the coil 34 undergoing test is an inductance coil designated as 38.

A wavemeter circuit designated by 40 is employed to indicate the reactance of the coil 34. This wavemeter is similar in construction and operation to that employed in Patent No. 1,792,320. It consists of an adjustably mounted winding 42 disposed adjacent to the coil 38 and connected in series with a current-responsive device 44, a variable condenser 46, and a variable resistance 48.

This wavemeter circuit is adjusted to be in resonance with the high frequency current traversing the winding 34 and coil 38. This adjustment is carried on by first connecting a considerable resistance in at 48 with the coil 42 disposed fairly close to the coil 38. The condenser 46 is then adjusted until the ammeter 44 shows the circuit containing the two windings to be in resonance. The winding 40 is then moved away from the coil 38 and the resistance 48 reduced to increase the sharpness of the tuning of the coupled circuit. The adjustment is continued in this manner until the winding 42 is so related to the winding 38 that the current in the coupled circuit causes full-scale deflection of the instrument 44 with no resistance in the circuit at 48.

It is preferred to tune the wavemeter 40 from the coil 38 of fixed inductance as shown because the test coil 34 may be of unusual shape and size and difficult to position with respect thereto. However, it may be desirable to tune from the test coil itself in some cases, such as when it is used alone in the oscillating circuit or because of other unusual conditions.

Referring to Fig. 2 the operation of the circuit may be described as follows: The winding 26 of the transformer 22 charges the condenser 30 to a potential which breaks down the spark gap 32. When this occurs, the resistance of this gap is lowered by ionization and an oscillating discharge takes place with a frequency which is a function of the constants of the circuit including the condenser 30, a condenser 36, inductance 38, and the coil undergoing test 34.

After the wavemeter has been calibrated with a good coil 34 in place, the coils to be tested are substituted therefor. A short circuit across a large portion of the turns of a coil undergoing test may be detected by the rapid increase in the current resulting therefrom. In the case of a short circuit across only a small portion of the coil, the frequency of the oscillations will change because of the change in inductance of the circuit. Thus the wavemeter 40, being tuned to the original frequency, will be out of resonance and indicate a fault even though the current and voltage change in the oscillating circuit is too small to detect.

With reference to Fig. 1, the operation is similar to that of Fig. 2. Its difference is that a faulty coil at 14 will be indicated by an increase in current through the ammeter 18 and a drop in the potential indicated by the gap 20. Obviously this circuit will give a somewhat less accurate indication of small short circuits than the wavemeter arrangement of Fig. 2, although it may be preferred for some types of tests.

It has been found that blowing an air stream over the spark gaps indicated at 12 and 32 serves to deionize these gaps between discharges and also to cool them sufficiently to prevent overheating and burning.

With the circuit described, it has been found that a steady uniform discharge may be obtained through the respective spark gaps. This steady discharge produces a uniform and constant train of strongly damped waves that are easily detected and read by either of the methods illustrated. The presence of the condenser at 16 or 36 serves to keep the meter reading steady, thereby providing more accurate test results. In addition, the arrangement may be readily embodied in an inexpensive portable test set operating from an ordinary power circuit.

Although the invention has been described with reference to specific embodiments, it will be evident that modifications may be made therein. Consequently, it is intended that the invention be limited only by the following claims.

I claim as my invention:

1. In combination, an insulated electrical winding, means for producing an oscillating discharge, said means including a spark gap and condenser arranged to discharge therethrough, a second condenser, means for connecting said winding and said second condenser in series circuit across said discharge producing means for energization thereby, and means for indicating the reaction of said winding to said discharge.

2. In combination, an insulated electrical winding, an alternating current source, means for producing a high frequency oscillating discharge, said means including a stationary spark gap and condenser means energized by said alternating current supply to discharge through said gap, conductor means connecting said winding for energization by said oscillating discharge means, a condenser interposed in said conductor means in series circuit with said winding, and means for indicating the reaction of said winding to said oscillating discharge.

3. Means for testing the insulation of an electrical winding comprising an alternating current source, a first condenser connected across said source to be charged thereby, a spark gap connected across said condenser to form a discharge path for said condenser upon its charge reaching a predetermined potential, a second condenser, means for connecting said winding and said second condenser in series circuit across said spark gap to be acted upon by the discharge therethrough, and means for indicating the reaction of said winding to said discharge.

4. Means for testing the insulation of an electrical winding comprising an alternating current source, a first condenser connected across said source to be charged thereby, a stationary spark gap connected across said condenser to form a discharge path for said condenser upon its charge reaching a predetermined potential, a second condenser, an inductance coil, means for connecting said winding, said second condenser and said coil in series circuit across said spark gap to be acted upon by the discharge therethrough, and means for receiving the energy radiated from said coil to indicate the frequency thereof.

JOHN R. STEEGSTRA.